United States Patent
Poliwoda et al.

(10) Patent No.: US 10,825,202 B2
(45) Date of Patent: Nov. 3, 2020

(54) METHOD FOR COMPRESSING MEASUREMENT DATA

(71) Applicant: Volume Graphics GmbH, Heidelberg (DE)

(72) Inventors: Christoph Poliwoda, Mannheim (DE); Christof Reinhart, Heidelberg (DE); Thomas Gunther, Heidelberg (DE)

(73) Assignee: Volume Graphics GmbH, Heidelberg (DE)

( * ) Notice: Subject to any disclaimer, the term of this patent is extended or adjusted under 35 U.S.C. 154(b) by 93 days.

(21) Appl. No.: 16/272,910

(22) Filed: Feb. 11, 2019

(65) Prior Publication Data

US 2019/0259183 A1 Aug. 22, 2019

(30) Foreign Application Priority Data

Feb. 20, 2018 (DE) ........................ 10 2018 103 715

(51) Int. Cl.
*G06T 9/00* (2006.01)
*G06T 3/40* (2006.01)
(Continued)

(52) U.S. Cl.
CPC .............. *G06T 9/00* (2013.01); *G06T 3/4007* (2013.01); *G06T 7/0004* (2013.01); *G06T 7/11* (2017.01);
(Continued)

(58) Field of Classification Search
CPC ....... G06T 9/00; G06T 3/4007; G06T 7/0004; G06T 7/11; G06T 2207/10081; G06T 2207/20021
See application file for complete search history.

(56) References Cited

U.S. PATENT DOCUMENTS 10,699,401 B2 * 6/2020 Flessner .................. G06T 19/20
2002/0062482 A1 5/2002 Bolle et al.
(Continued)

FOREIGN PATENT DOCUMENTS

WO 2011/112730 A2 9/2011

OTHER PUBLICATIONS

Minasny, Budiman; McBratney, Alex B.; Walvoort, Dennis J. J., "The variance quadtree algorithm: Use for spatial sampling design," Computers and Geosciences, vol. 33, Issue 3, p. 383-392 (2007).
(Continued)

*Primary Examiner* — Bobbak Safaipour
(74) *Attorney, Agent, or Firm* — SoCal IP Law Group LLP; Angelo Gaz

(57) ABSTRACT

Computer-implemented methods and computer-readable media for compressing a digital representation of an object. The object representation comprises a plurality of pixels arranged at least a first distance apart from each other in a two-dimensional plane or in a three-dimensional space. Each pixel is assigned at least one item of image information determined by a metrological representation of the object. The image information of a first pixel is correlated with the image information of pixels within an environment of the first pixel defined by a correlation length. The method comprises determining the object representation, determining the correlation length, determining a second distance less than or equal to the correlation length and greater than the first distance, and adjusting the object representation so that the pixels are arranged apart from each other by at least the second distance and by no greater than the correlation length.

16 Claims, 3 Drawing Sheets

(51) Int. Cl.
*G06T 7/11* (2017.01)
*G06T 7/00* (2017.01)

(52) U.S. Cl.
CPC .............. *G06T 2207/10081* (2013.01); *G06T 2207/20021* (2013.01)

(56) References Cited

U.S. PATENT DOCUMENTS

| | | | | |
|---|---|---|---|---|
| 2014/0168458 | A1* | 6/2014 | Richards | H04N 9/04 348/222.1 |
| 2019/0079158 | A1* | 3/2019 | Karafin | G06T 7/11 |
| 2019/0355316 | A1* | 11/2019 | Ji | G09G 3/3426 |
| 2020/0118300 | A1* | 4/2020 | Poliwoda | G06T 17/20 |
| 2020/0160499 | A1* | 5/2020 | Poliwoda | G06T 11/005 |

OTHER PUBLICATIONS

Wolberg, George, "Geometric Transformation Techniques for Digital Images: A Survey," Columbia University, Department of Computer Science, Technical Report CUCS-390-88, Dec. 1988. 10 pages.

Läpple, Richard, "Measure faster with less data" QZ.online.de, Portal for Quality Management, Issue 4 (2016), Hanser Publishing Company, pp. 134-135. 2 pages.

\* cited by examiner

METHOD FOR COMPRESSING MEASUREMENT DATA

RELATED APPLICATIONS

This application claims priority from German application no. DE 10 2018 103 715.5 filed Feb. 20, 2018.

BACKGROUND

The present invention relates to a computer-implemented method for compressing a digital representation of an object according to claim 1, and to a computer-readable medium according to claim 9.

In the field of non-destructive workpiece inspection, a wide variety of methods have become established in recent years. In addition to tactile measurement techniques for measuring the surfaces of a workpiece, the methods which have gained in importance in particular are those that allow a representation of the internal structure of a workpiece, such as magnetic resonance tomography or computer-aided tomography. In the course of an examination of a workpiece, a plurality of sectional images is generated, which usually use a gray-scale representation to provide information about the points of a workpiece at which a certain material-specific parameter of the workpiece takes on which particular value.

Depending on the number of recorded sectional images and the resolution of the respective image, large amounts of data can be generated in a short time, which usually need to be stored to allow long-term interpretation of the measurements. For the processing or analysis of the representations of a workpiece it is also necessary to store the associated data volumes in the working memory of a data processing unit.

There is therefore a need in the prior art for a method for compressing digital representations of an object.

This object is achieved by means of the computer-implemented method in accordance with the present invention.

SUMMARY

The main features of the invention are specified in claim 1 as well as claim 9. Configurations of the invention are the subject matter of claims 2-8 and 10-16.

In a first aspect the invention relates to a computer-implemented method for compressing a digital representation of an object, wherein the object representation comprises a plurality of pixels arranged in a two-dimensional plane or in a three-dimensional space. Each pixel is assigned at least one item of image information determined by a metrological representation of the object, wherein the pixels are arranged in the plane or the space at least a first distance apart from each other. Due to the metrological representation of the object, the image information of a first pixel is correlated with the image information of pixels within an environment of the first pixel defined by a correlation length of the representation. The method comprises firstly determining the object representation. Then, the correlation length of the representation is determined and based on the correlation length a second distance is determined, which is less than or equal to the correlation length and greater than the first distance. Finally, the object representation is adjusted in such a way that the pixels of the grid are arranged apart from each other by at least the second distance and by no greater than the correlation length. In effect therefore, the mean distance between the pixels in the object representation is increased, allowing the total number of pixels to be reduced.

The method according to the invention is based on the recognition that, due to a correlation of pixels, parts of the image information of a first pixel are also contained in the image information of a pixel that is correlated with the first pixel. Consequently, the object representation is ideally adjusted to match the correlation length of the image so that each of the image information items of the pixels in the adjusted object representation are correlated with each other to a minimum extent, and ideally not at all. This is the case precisely when the distance between the pixels remaining after the adjustment is as close as possible to the correlation length, but is not greater than this. Due to the fact that image information of correlated pixels is also always included in other pixels, no relevant information about the object is lost.

A "digital representation" of an object in this case is a two- or three-dimensional representation, in which a represented object is modeled by a plurality of pixels which are arranged within a two-dimensional plane or a three-dimensional space such that they can represent the object with sufficient accuracy. The pixels are assigned a local material-specific value of the object for the position of the pixel within the object representation, wherein reproducing the object representation requires corresponding image information to be reproduced. The reproduction of such a material-specific value can be carried out, for example, by means of a gray-scale value, which can take values for example between 0 and 65535, which corresponds to a representation of a material-specific value with a depth of 16 bits.

A "material-specific value" here is a characteristic value that is typical of the imaging method used, which represents a local material composition. Taking the example of magnetic resonance imaging, the material-specific value is, for example, a nuclear spin relaxation time. A material-specific value may additionally also encode the position of a material interface relative to the pixel, or directly encode the existence of a material interface at the point of the pixel. By reproduction of such values it is possible to represent the structure of a represented object, in particular its exact geometry. In order to determine such an object representation, a measurement can be carried out with a suitable measuring device, for example, or else corresponding previously recorded measurements can be retrieved from a storage medium.

Depending on the type of object representation, different approaches to the adjustment of the object representation exist for the purposes of the present invention. According to one embodiment, it is provided that the pixels of the object representation are arranged in a first grid. The adjustment of the object representation then comprises firstly overlaying the object representation with a second grid consisting of lattice points, wherein the lattice constant of the second grid is at least equal to the second distance and is no greater than, or in particular exactly equal to, the correlation length. Then, image information for the lattice points of the second grid is determined from the image information of the pixels of the first grid, and the determined image information items are assigned to the respective lattice points. Finally, the lattice points are defined as new pixels of the object representation.

This means that, firstly, a second grid to be used and/or its lattice constant can be freely chosen, which allows a simple adjustment to the previously calculated correlation length and the second distance calculated therefrom. A "lattice constant" of the second grid here means the distance between two grid points along a grid line of the second grid.

It is also entirely possible that the grid is formed from lattice points that differ from a typically square, orthogonal grid. Instead, in this case it is possible that the modified grid is adjusted to match a structure of the object represented.

Thus, for example, it is also conceivable in this case that a grid is used, which does not have the same lattice constant or the same orientation of the grid lines everywhere in the object representation. Instead, for example, in regions of an object representation in which a largely homogeneous gray-scale value is present, a very large lattice constant can be selected, which is either almost or exactly equal to the correlation length, while in regions of the object representation with very many details a lattice constant is selected which may be substantially smaller than the correlation length. Consequently, the previously described embodiment allows a very flexible adjustment of the grid used, both to the correlation length of the object representation and to the details or characteristics of the object representation.

In addition to the previously described adjustment of the lattice constant or the geometry of the grid to match local characteristics of the represented object, by using a grid with locally different lattice constants it is also possible to take account of the fact that the correlation length of a representation of an object can be strongly dependent on direction. Such a directional dependence of the correlation length can occur, for example, if a computer tomography of the object is carried out to examine an object, wherein a fan beam is used for the purpose. In the case of a direction-dependent correlation length, according to a further embodiment it can be provided that the determination of the correlation length described above is performed in at least two directions within the object representation. The grid of the object representation can then be adjusted accordingly in a direction-dependent manner.

To determine the image information of the lattice points, according to one embodiment it can be provided that the image information of the lattice points is determined by interpolation of image information from pixels of the object representation. A variety of approaches to the interpolation of information are described in the prior art, so that the exact implementation of the interpolation will not be explained further here. For determining image information for a lattice point, both the image information of pixels in the immediate vicinity of the lattice point as well as more distant pixels can be taken into account.

In addition to the previously described approach to the adjustment of a rasterized object representation a variety of other approaches are conceivable, which can be applied to adjust an object representation during the method according to the invention. Thus, for example, by selective deletion of pixels from an object representation a compression of a digital representation within the meaning of the present invention can be achieved. Such an approach can be implemented both for rasterized and for non-rasterized object representations.

As has previously been stated, due to the correlation of the image information of the pixels the image information of a first pixel is partly also included in the pixels that are correlated with the first pixel. As a result, a number of pixels, or the corresponding image information, can be deleted from an object representation without the corresponding image information being lost. Instead, given an appropriate choice of the deleted pixels the image information deleted with the pixels remains included in the image information of the pixels correlated with the deleted pixels.

For example, in the case of a rasterized object representation, if the correlation length corresponds to at least twice the distance between two pixels within the grid, effectively every second pixel along a grid line in the object representation can be deleted without losing relevant image information. By suitable choice of the pixels to be deleted, the essential structure of the grid can be maintained in such a way that, for example, a previously used orthogonal and regular grid remains orthogonal and regular even after the adjustment by deletion of pixels. It is also possible, however, that the structure of the grid is changed by the selective deletion of pixels.

Also in the case of a non-rasterized object representation, such as an object representation which only reproduces the material interfaces of the object, an adjustment of the object representation is possible by selective deletion of pixels within the meaning of the present invention. Usually, in such a representation of the material interfaces of an object the pixels are initially arranged irregularly. In the simplest case, in such an object representation a second pixel can be deleted based on a first pixel if additional pixels to the first pixel exist in the direction of the second pixel, which are further away from the first pixel than the second pixel but whose distance from the first pixel is no greater than the correlation length.

However, it is also conceivable that, by the adjustment of the object representation as part of the present invention, the arrangement of the pixels is modified such that after the adjustment the previously irregularly arranged pixels exist in a regular arrangement. To this end, for example, for positions at which no pixel previously existed, but which would be required for a regular arrangement of pixels, image information can be interpolated from the image information of adjacent pixels.

In all of the previously described embodiments it was initially assumed that the correlation length of the object representation is the same size at all positions of the object representation, apart from a possible direction dependency. It is entirely possible, however, that the correlation length can have different values in different regions of the object representation. Therefore, according to a further embodiment it is provided that the method also comprises the subdivision of the object representation into at least two sub-regions, wherein the correlation length for the pixels of one of the sub-regions is determined separately for each of the sub-regions. The choice of the sub-regions can be determined by the location of pixels within the digital representation, or by the image information contained in the corresponding pixels. If this results in a different correlation length being determined for different sub-regions, then a second distance is determined for each of the sections and the object representation is adjusted accordingly.

The correlation of the image information of different pixels can be due to a variety of reasons, which can be taken into account in determining the correlation length. According to one embodiment therefore, it is provided that the correlation length is the width of a point spread function of the digital representation. The point spread function of a representation in general provides information about how an inherent point source is "smeared" as a result of modeling by the representation system, i.e. deviates from the ideal, point-like representation. The point spread function of an imaging system can exist as a global piece of information for the imaging system and, for example, can be read from an appropriate storage medium during the implementation of the method.

According to a further embodiment, however, it is also possible to calculate the point spread function from the image information of the object representation. To achieve this, according to the embodiment it is provided that the determination of the correlation length first comprises the detection of a second subset of pixels, wherein the image information of the second subset of pixels represents at least one material interface of the object. Then, a profile of the image information of the second subset of pixels is determined along a normal to the material interface, and from the calculated profile the point spread function is calculated. The correlation length can then be determined from the width of the point spread function. In order to calculate the point spread function from the profile of the image information, for example the gradient of the image information along the curve can be determined. The resulting gradient then directly provides information about the point spread function of the representation in the region of the selected curve.

The point spread function usually follows a bell curve, which can be approximated by a Gaussian curve. The "width" of the point spread function thus obtained can then be expressed as a multiple of the standard deviation of the Gaussian curve, wherein by the choice of the appropriate prefactor, the maximum permissible degree of correlation between image information items can be chosen. The analysis of the point spread function then allows an estimation of an upper limit for the correlation length.

A "material interface" is understood to mean a surface of the object at which different materials of the object come into contact with one another, or along which the object is bounded with respect to its environment. The above-mentioned embodiment is based on the recognition that due to the point spread function of the imaging system, what is in fact a sharp or stepped profile of the gray-scale values in the normal direction of a material interface is blurred to form a profile which corresponds to the integral of the point spread function. Consequently, the derivative of this curve, or more generally the gradient of the curve, can be used to determine the point spread function of the imaging system. As has already been stated, in a preferred embodiment the point spread function is determined separately for different regions of the object representation. In this way, it is possible to take account of the fact that the point spread function of an imaging system can take different forms for different regions of an object representation. Also, when the point spread function is used to determine the correlation length, a direction dependency on the point spread function can also be taken into account, so that different correlation lengths are assumed for different directions within the object representation.

In particular, it can happen that in certain regions of the object representation the point spread function of the representation is not suitable for determining a correlation length with sufficient accuracy. In these cases it may also be provided that for regions where this determination is not possible, an interpolation of the correlation length is performed based on regions in which a determination of the correlation length was still possible. In this way, in the ideal case every pixel of the object representation can be assigned a correlation length.

According to one embodiment the metrological representation is a computer tomography measurement, wherein an image information item of a pixel describes the local x-ray absorption of the object at the location of the pixel. In this case, the image information of the pixels is determined by means of a suitable mathematical reconstruction procedure from projection data, which were obtained during the computer tomography imaging. It can be advantageous here to calculate the correlation length of the image information directly from the projection data. For this purpose, the previously described approaches to the calculation of the point spread function can also be applied to projection data in an identical way. The information received in relation to a correlation of the projection data can then be transformed into relevant information for the image information of the reconstructed object representation by applying the same reconstruction mathematics. With the correlation information obtained the reconstructed object representation, which is generally a three-dimensional volumetric representation of the object, can then be compressed by adjusting the pixels of the object representation.

In addition to a compression of the three-dimensional volumetric representation, it is also possible within the present invention to compress the two-dimensional projection data, which are also to be interpreted as a digital representation of an object, by means of the described method. It can be advantageous in this case to compress the logarithmic projection intensities, in order to avoid unwanted effects.

A further aspect of the invention relates to a computer-readable medium having instructions executable on a computer, which when executed on a computer cause the computer to carry out the method as previously described.

DESCRIPTION OF THE DRAWINGS

Further features, details and advantages of the invention result from the wording of the claims, as well as from the following description of embodiments on the basis of the drawings. Shown are:

In the following, similar or identical features are identified with the same reference symbol.

DETAILED DESCRIPTION

Figure 1:
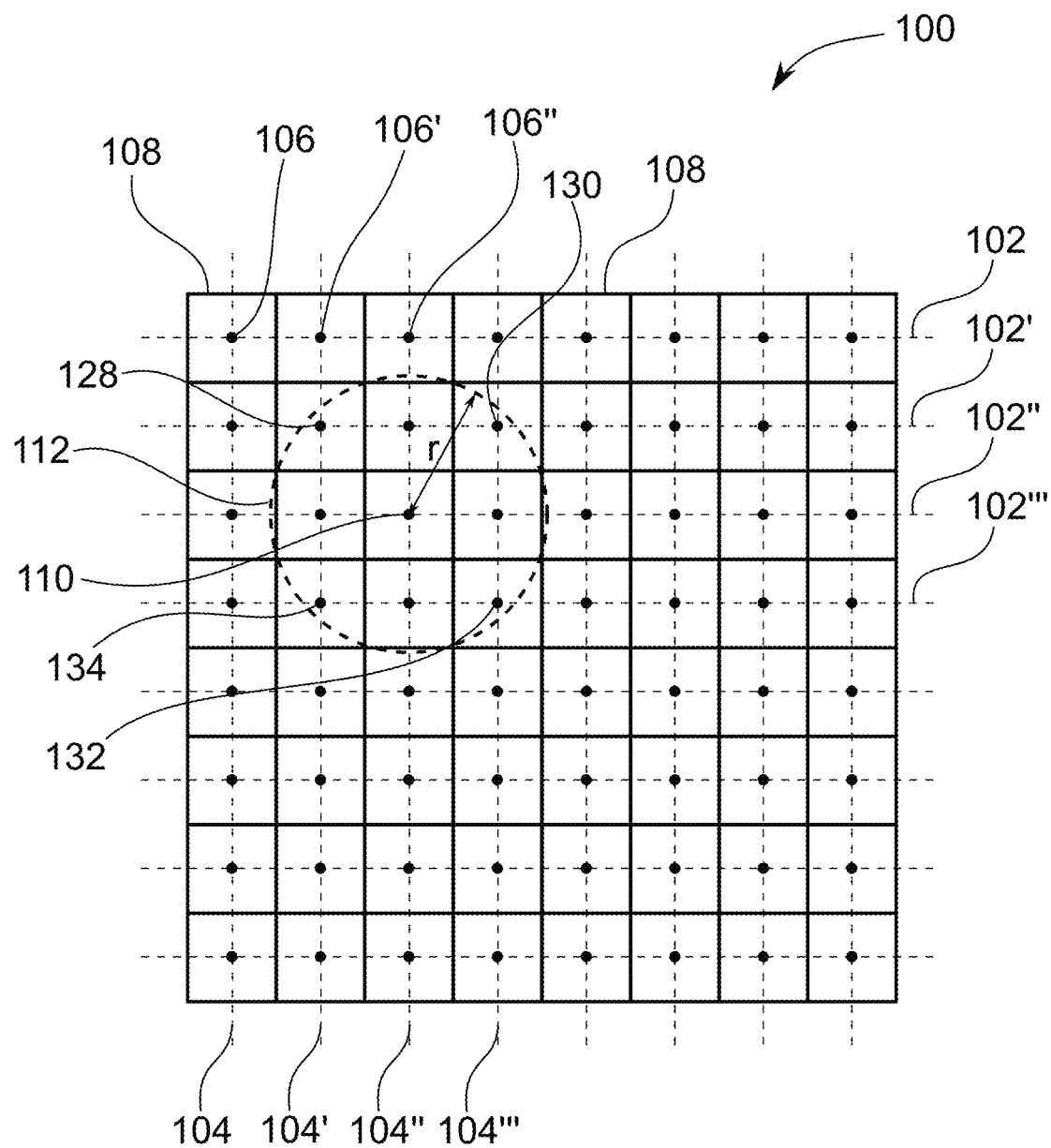
FIG. 1: a schematic drawing of a grid with pixels.

FIG. 1 shows a schematic representation of a grid 100 for representing an object which is imaged by means of an imaging procedure. Such an object can be, for example, a workpiece or similar object. The grid 100 is essentially formed by a plurality of grid lines 102 and 104, which in the grid 100 shown in FIG. 1 form a square grid 100. A square grid 100 is defined as a grid 100, in which both horizontal grid lines 102 and vertical grid lines 104 are arranged equidistant from each other in each case, wherein the horizontal grid lines 102 intersect the vertical grid lines 104 at right angles and the distance between the horizontal grid lines 102 is equal to the distance between the vertical grid lines 104.

At the intersections of the grid lines 102 and 104 in the grid 100 shown, pixels 106 are arranged in each case. To represent an object by means of the grid 100, the object is overlaid with the grid 100. The pixels 106 are then assigned image information items, which characterize the object within a defined region 108 around a pixel 106. Using the example of a computer tomographic representation, the image information of a pixel 106 can reproduce, for example, the local x-ray density of the object in the region 108 around the pixel 106. In the form of the grid 100 shown in FIG. 1, the region 108 around a pixel 106, which is taken into account in determining the image information, is chosen to be square. In order to determine image information of a pixel 106, for example a mean value for a material-specific parameter within the region 108 can be determined and assigned to the pixel 106 as image information.

As has been stated above, in one preferred embodiment the representation of the scanned object is generated by a computer tomography image. In this case an object is arranged between an x-ray source and a detector and irradiated with x-ray radiation generated by the x-ray source. The x-ray radiation scattered or transmitted by the object is then recorded and measured by the detector. A detector generally consists of a plurality of photosensitive cells, which are also designated as "detector pixels". These detector pixels are usually arranged in a regular grid. The irradiation by such a detector therefore automatically generates a rasterized projection image of the irradiated object, because the individual detector pixels can only detect a radiation intensity which is averaged over the surface area of a detector pixel. From the rasterized projection images thus determined, by means of a suitable back-projection a representation of the geometry of the object can then be calculated, which as a result of the rasterization of the underlying projection data is also rasterized.

Due to a variety of effects the resulting image information that is assigned to a pixel 106 of the rasterized object representation is correlated with the image information of pixels 106' in the vicinity of the pixel 106. A correlation is understood to mean that the image information items from the correlated pixels 106 contain common information, or that the image information items of the pixels 106 and 106' are related to each other. Reasons for such a correlation can include, for example, the fact that imaging effects occur during the recording of the projection data, which cause information that should actually only be assigned to a single detector pixel or ultimately a single pixel 106 to become blurred, so that it is assigned to a plurality of pixels 106. Such an effect can be described, for example, by the point spreading function of the imaging system.

The correlation of image information based on the image information of a first pixel 106 generally does not extend over the entire object representation but is actually spatially limited. A characterizing factor for this spatial limitation is the correlation length. The correlation length specifies information on the distance between two pixels 106, beyond which it can be assumed that the contents of the image information assigned to the pixels are no longer correlated. In FIG. 1, for a pixel 110, which is located at the intersection point of the grid lines 102" and 104", the correlation length 112 is represented by the example of a circle with radius r. For all pixels 106 within this circle 112, it can be assumed that the image information of the pixels 106 is correlated with the image information of the pixel 110.

Figure 2:
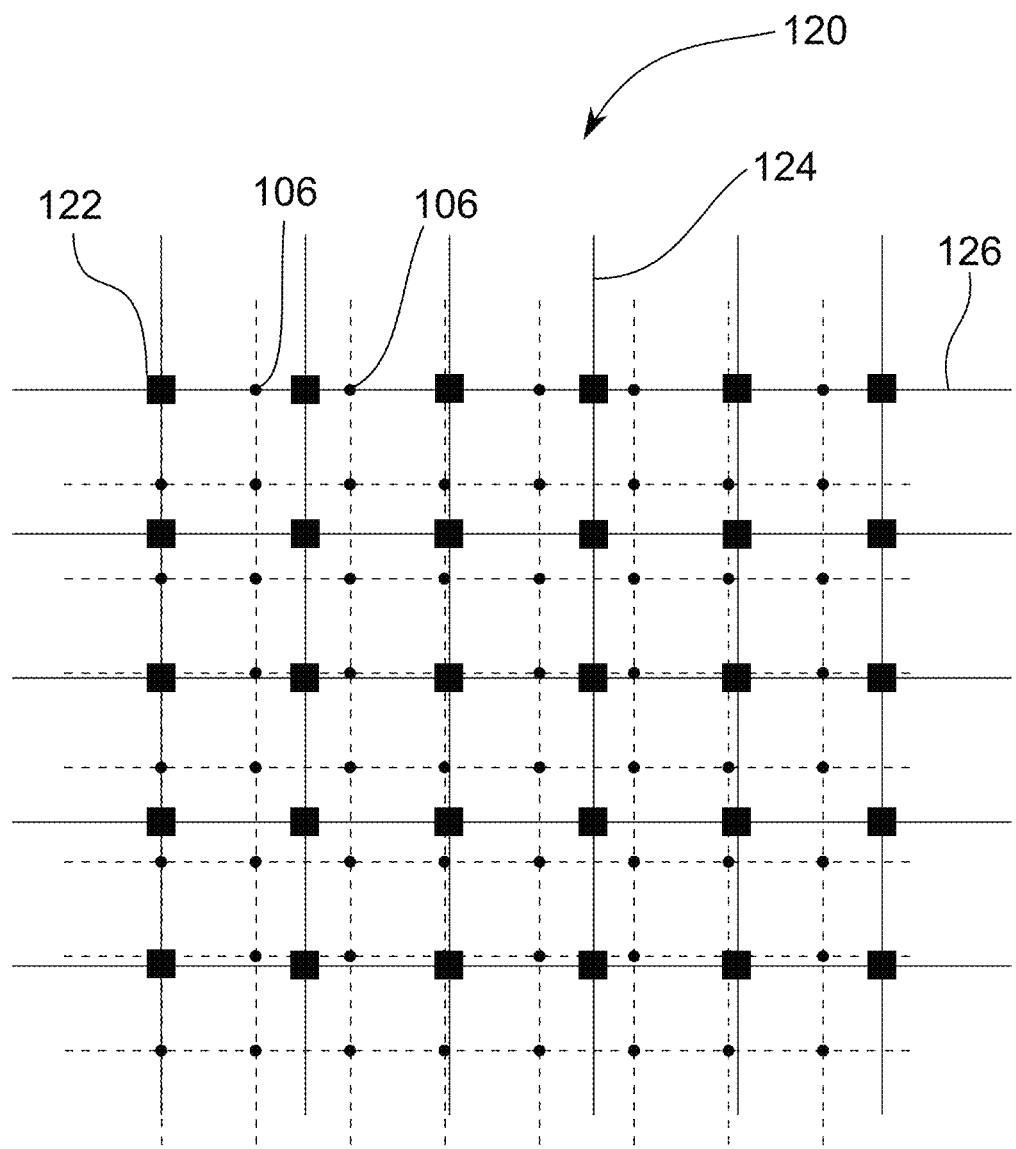
FIG. 2: a schematic drawing of a superposition of two grids with different lattice constants.

FIG. 2 illustrates an approach based on FIG. 1, with which a grid 100 can be adjusted to a previously calculated correlation length, or to a second distance determined from the correlation length. For this purpose, a second grid 120 is determined, whose lattice constant has been selected according to the previously determined second distance. In this case the lattice constant is chosen to be larger than the second distance, but less than or equal to the correlation length. In FIG. 2 the second grid 120 calculated in this way is shown in the form of square pixels 122 and solid lattice lines 124 and 126, so that it can be distinguished from the original grid 100. In the embodiment shown, both the original grid 100 and the second grid 120 are square, symmetrical grids. The described procedure is also transferable to such cases in which the second grid 120 deviates from the basic geometry of the first grid 100 and is asymmetrical, for example.

The individual pixels 122 of the second grid 120 are initially not assigned any image information. The assignment of image information to the pixels 122 of the second grid 120 is carried out according to one embodiment of the present invention by first determining a set of pixels 106 of the original grid 100, which are arranged directly adjacent to a selected pixel 122 of the second grid 120. For these pixels 106 the image information is then determined and from the resulting image information, by using an interpolation method image information is determined for the position of the selected pixel 122. The resulting image information is then assigned to the selected pixel 122.

In order to determine the image information of a pixel 122 of the second grid 120, the image information from at least two adjacent pixels 106 of the original grid 100 is taken into account. However, it is also entirely possible that in order to determine the image information of a pixel 122 of the new grid 120, more than two pixels are considered. In addition, in the interpolation of the image information from the image information of individual pixels 106 it is also possible to consider information regarding the geometry, or composition of the represented object.

Once all the pixels 122 of the new grid 120 have been assigned image information, the original grid 100 with the pixels 106 is deleted.

Figure 3:
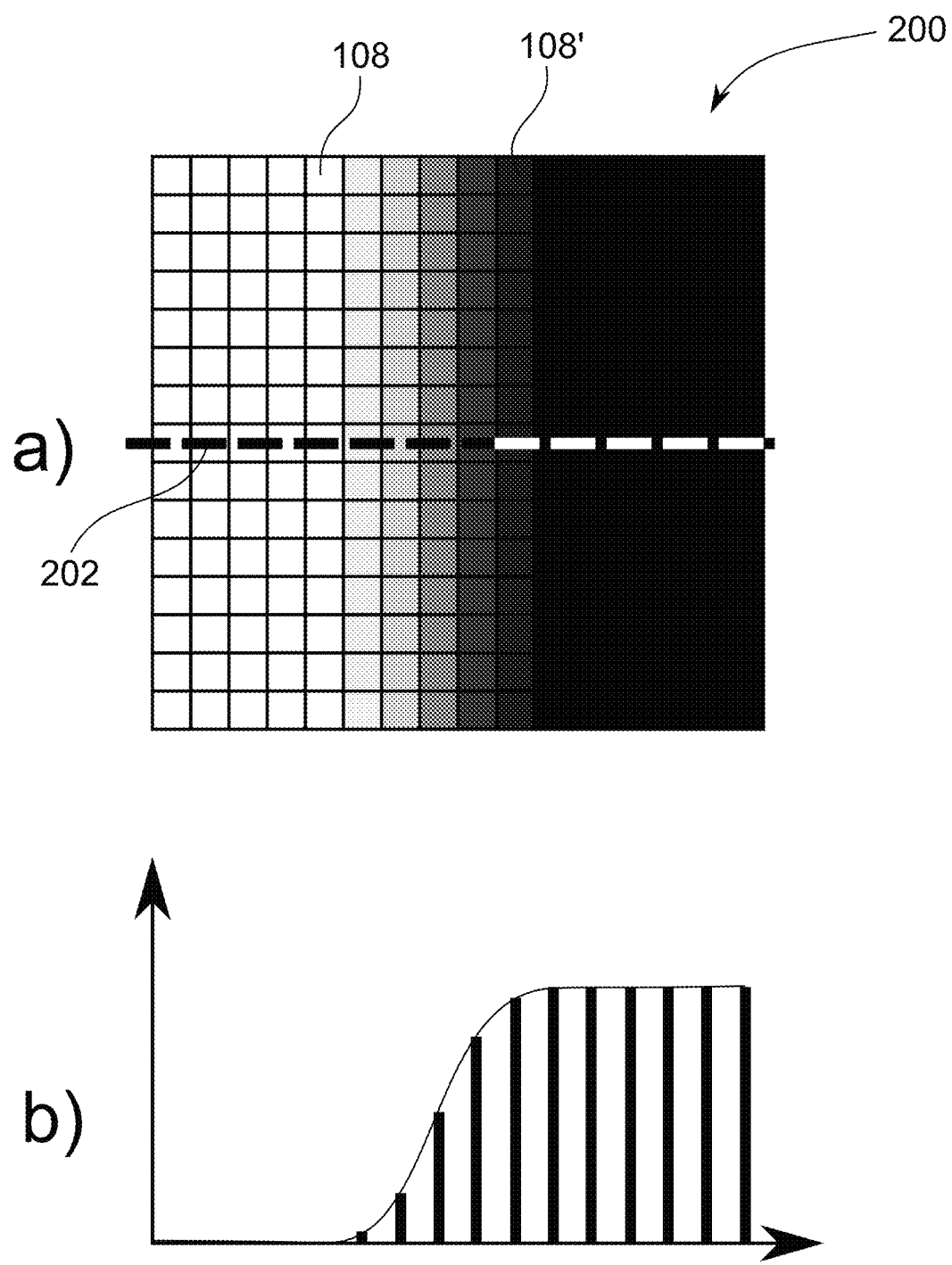
FIG. 3: a schematic drawing of a detail of an object representation.

FIG. 3 a) shows a schematic drawing of a detail of an object representation 200. The object representation 200 in this case uses a grid 100, as has been described previously with reference to FIG. 1. It is therefore a square grid 100, in which the respective regions 108, which are assigned to a pixel 106 and represent the current value of the image information graphically by displaying a gray-scale value, are designed to be square and are arranged in a regular pattern. The pixels 106 and grid lines 102 and 104 are omitted in FIG. 3 a) for reasons of clarity.

In the image excerpt of the object representation shown in FIG. 3 a), a vertical material interface of the displayed object is shown, i.e. an area in which a first material of the object adjoins a second material. In this case, the material shown on the left-hand side has a stronger x-ray absorption than the material shown on the right-hand side, so that the region on the left-hand side of the image excerpt is shown brighter than the region on the right-hand side of the image excerpt. For example, the region shown can be an interface of the displayed object, at which the object is bounded with respect to the ambient air.

Due to the generally sharp transition between two materials which takes place at such a material interface, it is to be expected that such a sharp edge would be also be observable in the object representation 200. Due to a variety of factors, however, this is not the case. An essential factor which leads to the smearing of sharp contours is the point spread function of the imaging system. This normally approximates to a Gaussian function, which depends on a plurality of parameters of the imaging system. Convolving a sharply defined material interface with the point spread function of the imaging system results in the curve shown in FIG. 3 a).

A further consequence of the point spread function is the fact that the image information items of the individual pixels 106 are correlated with each other, because the image information of a pixel 106 always includes part of the image information from adjacent pixels 106' and vice versa.

As already noted above, the present invention essentially involves the idea of adjusting the structure of a grid 100, by means of which an object representation 200 was generated, to a correlation length of the image information present in the object representation 200. Such a correlation length can be determined, for example, from the point spread function of the representation. For example, it can be stipulated that along a normal to a material interface, such as the straight line 202, a graph of the gray-scale values is determined. The shape of the underlying point spread function is then obtained in a simple manner from the gradient of this graph. From the knowledge of the shape of the point spread function, the width, in particular the half-width of the point spread function, can then be used in turn to determine the correlation length induced by the point spread function.

Because of the respective profile of the gray-scale values in different regions of the object representation, in these regions the determination of a point spread function from the image information may be difficult or even impossible. It is also possible according to one embodiment, however, to estimate the point spread function and hence the correlation length for such regions from the correlation lengths of adjacent regions by the application of an interpolation method. In such regions an estimation of the correlation and a suitable selection of pixels are also possible.

The invention is not restricted to any one of the embodiments described above, but may be modified in a wide variety of ways.

Although in FIGS. 1 to 3 only a two-dimensional design of a grid 100 with pixels 106 arranged therein is shown, the above statements are transferable by analogy to a three-dimensional representation of an object with a corresponding grid. Furthermore, the invention can by all means also be applied in other grids than the square grid illustrated. In particular, a grid can also be designed as a grid which is locally different, having different lattice constants or different orientations of the raster lines 102, 104 in different areas of the object representation.

The previously described method has always been implemented with reference to an object representation. However, in particular when computer tomography is used to determine the object representation, it is also conceivable that the raster of the projection data generated during the computer tomography itself is adjusted in accordance with the invention to the correlation length of the information thus determined.

All of the specified features and advantages resulting from the claims, the description and the drawing, including constructional details, spatial arrangements and method steps, can be essential to the invention either in themselves or in the most diverse of combinations.

LIST OF REFERENCE NUMERALS

100 grid
102 grid line
104 grid line
106 pixel
108 region
110 pixel
112 circle
120 second grid
122 pixel
124 grid line
126 grid line
200 object representation
202 straight line
r radius It is claimed:

1. A computer-implemented method for compressing a digital representation of an object, wherein the object representation comprises a plurality of pixels arranged in a two-dimensional plane or in a three-dimensional space, wherein each pixel is assigned at least one item of image information obtained from a metrological representation of the object, wherein the pixels are arranged in the plane or the space at least a first distance apart from each other, wherein due to the metrological representation of the object the image information of a first pixel is correlated with the image information of pixels within an environment of the first pixel defined by a correlation length of the representation, the method comprising the following steps:
   a) determining the object representation,
   b) determining the correlation length of the representation,
   c) determining a second distance based on the correlation length, wherein the second distance is less than or equal to the correlation length and larger than the first distance,
   d) adjusting the object representation so that the pixels in the object representation are arranged apart from each other by at least the second distance and by no greater than the correlation length.

2. The method as claimed in claim 1, characterized in that the pixels of the object representation are arranged in a first grid, wherein adjusting the object representation comprises the following steps:
   a) overlaying the object representation with a second grid consisting of lattice points, wherein the lattice constant of the second grid is at least equal to the second distance and is no greater than the correlation length,
   b) determining image information for the lattice points of the second grid from the image information from the pixels of the first grid,
   c) assigning the determined image information to the respective lattice points and
   d) defining the lattice points as new pixels of the object representation.

3. The method as claimed in claim 2, characterized in that the image information items of the lattice points are determined by interpolation of image information of the pixels of the first grid.

4. The method as claimed in claim 2, characterized in that the lattice constant of the second grid corresponds exactly to the correlation length.

5. The method as claimed in claim 1, characterized in that the method also comprises the subdivision of the object representation into at least two sub-regions, wherein the correlation length for the pixels of the sub-regions is determined separately for each of the sub-regions and the object representation for the sub-regions is adjusted individually.

6. The method as claimed in claim 1, characterized in that the correlation length is a width of a point spread function of the digital representation.

7. The method as claimed in claim 6, characterized in that the determination of the point spread function has the following steps:
   a) identifying a subset of pixels, wherein the image information items of the subset of pixels represent at least one material interface of the object,
   b) determining a profile of the image information of the subset of pixels along the normal to the material interface, and
   c) determining the point spread function from the determined profile.

8. The method as claimed in claim 1, characterized in that the metrological representation is a computer tomography measurement, wherein the image information assigned to each pixel describes the local x-ray absorption of the object at a corresponding measuring point.

9. A non-transitory computer-readable medium storing instructions, which when executed on a computer cause the computer to carry out a method for compressing a digital representation of an object, wherein the object representation comprises a plurality of pixels arranged in a two-dimensional plane or in a three-dimensional space, wherein each pixel is assigned at least one item of image information obtained from a metrological representation of the object, wherein the pixels are arranged in the plane or the space at least a first distance apart from each other, wherein due to the metrological representation of the object the image information of a first pixel is correlated with the image information of pixels within an environment of the first pixel defined by a correlation length of the representation, the method comprising the following steps: a) determining the object representation, b) determining the correlation length of the representation, c) determining a second distance based on the correlation length, wherein the second distance is less than or equal to the correlation length and larger than the first distance, d) adjusting the object representation so that the pixels in the object representation are arranged apart from each other by at least the second distance and by no greater than the correlation length.

10. The non-transitory computer-readable medium as claimed in claim 9, characterized in that the pixels of the object representation are arranged in a first grid, wherein adjusting the object representation comprises the following steps: a) overlaying the object representation with a second grid consisting of lattice points, wherein the lattice constant of the second grid is at least equal to the second distance and is no greater than the correlation length, b) determining image information for the lattice points of the second grid from the image information from the pixels of the first grid, c) assigning the determined image information to the respective lattice points and d) defining the lattice points as new pixels of the object representation.

11. The non-transitory computer-readable medium as claimed in claim 10, characterized in that the image information items of the lattice points are determined by interpolation of image information of the pixels of the first grid.

12. The non-transitory computer-readable medium as claimed in claim 10, characterized in that the lattice constant of the second grid corresponds exactly to the correlation length.

13. The non-transitory computer-readable medium as claimed in claim 9, characterized in that the method also comprises the subdivision of the object representation into at least two sub-regions, wherein the correlation length for the pixels of the sub-regions is determined separately for each of the sub-regions and the object representation for the sub-regions is adjusted individually.

14. The non-transitory computer-readable medium as claimed in claim 9, characterized in that the correlation length is a width of a point spread function of the digital representation.

15. The non-transitory computer-readable medium as claimed in claim 14, characterized in that the determination of the point spread function has the following steps: a) identifying a subset of pixels, wherein the image information items of the subset of pixels represent at least one material interface of the object, b) determining a profile of the image information of the subset of pixels along the normal to the material interface, and c) determining the point spread function from the determined profile.

16. The non-transitory computer-readable medium as claimed in claim 9, characterized in that the metrological representation is a computer tomography measurement, wherein the image information assigned to each pixel describes the local x-ray absorption of the object at a corresponding measuring point.

* * * * *